United States Patent [19]

Lyerly

[11] Patent Number: 6,047,664
[45] Date of Patent: Apr. 11, 2000

[54] ELECTRONIC TRAINING LEASH AND COLLAR

[75] Inventor: Thomas C. Lyerly, Knoxville, Tenn.

[73] Assignee: Radio Systems Corporation, Knoxville, Tenn.

[21] Appl. No.: 09/080,686

[22] Filed: May 18, 1998

[51] Int. Cl.⁷ ................................................ A01K 15/00
[52] U.S. Cl. .......................... 119/719; 119/720; 119/908
[58] Field of Search .................... 119/719, 720, 119/721, 859, 860, 908; 340/384.1, 573

[56] References Cited

U.S. PATENT DOCUMENTS

| 2,023,950 | 12/1935 | Carter . | |
| 3,072,097 | 1/1963 | Morchand . | |
| 3,874,339 | 4/1975 | Coulbourn . | |
| 4,304,193 | 12/1981 | Madden | 54/71 |
| 4,802,482 | 2/1989 | Gonda et al. | 119/720 |
| 5,241,923 | 9/1993 | Janning | 119/721 |
| 5,465,687 | 11/1995 | Custer | 119/719 |
| 5,471,954 | 12/1995 | Gonda et al. | 119/859 |
| 5,559,498 | 9/1996 | Westrick et al. | 340/573 |
| 5,617,814 | 4/1997 | Bianco et al. | 119/720 |
| 5,775,970 | 7/1998 | Klees et al. | 446/297 |
| 5,857,433 | 1/1999 | Files | 119/720 |
| 5,872,516 | 2/1999 | Bonge, Jr. | 119/719 |
| 5,911,199 | 6/1999 | Farkas et al. | 119/859 |

FOREIGN PATENT DOCUMENTS 113556  3/1945  Sweden .

Primary Examiner—Peter M. Poon
Assistant Examiner—Yvonne R. Abbott
Attorney, Agent, or Firm—Pitts & Brittian, P.C.

[57] ABSTRACT

An electronic training leash and collar is provided for training an animal by providing consistent negative reinforcement regardless of the trainer. The elongated leash member includes a control module, proximately attached to an adjustable handle, electrically connected to a reinforcement module, proximately attached to an adjustable collar loop. The intensity of the control stimulus is selected by cycling the reinforcement processing device through a plurality of intensity levels incrementally spaced between a predetermined minimum and maximum voltage. Use of the correction button illuminates a visual indicator, and generates both an audible warning sound and an electrical stimulus from the reinforcement module. Similarly, the warning button illuminates the visual indicator and generates an audible warning sound from the reinforcement module. A timer limits abusive use of the corrective stimulus.

11 Claims, 7 Drawing Sheets

ELECTRONIC TRAINING LEASH AND COLLAR

TECHNICAL FIELD

This invention relates to the field of animal training devices. More particularly, it relates to a leash and collar that incorporates an electronic shock circuit for leash training an animal, especially a pet such as a dog.

BACKGROUND ART

For many years, pet owners, especially dog owners, and trainers have used the training collar and leash as the standard method of obedience training. The correction is accomplished by simply pulling or jerking on the dog's leash. Many dog owners, motivated by a fear of injuring the dog, have a tendency to correct the dog with mild jerks. This method of correction may require several hundred jerks to correct the dog's behavior. Professional trainers tend not to be similarly burdened and have a tendency of jerking the dog much harder than the owner, and are able to correct the dog's behavior with a minimum of jerks on the leash. Large dogs in excess of a hundred pounds body weight present a special problem. Namely, some dog owners weigh less than the dog and do not have the strength to jerk the leash hard enough to provide a meaningful correction to the dog.

The fundamental problem with conventional leash training is the inherent inconsistency in delivery of the corrective stimulus. For any given dog, the magnitude and frequency of the corrective stimulus is dependent upon the nature of the person delivering the stimulus. This lack of consistency in the magnitude and frequency of the corrective stimulus certainly has the potential for being, and is believed to be, confusing to the dog. This is especially true when both the professional trainer and the pet owner are jerking the leash in different ways during the same period of training.

Other devices for training animals have been previously disclosed. Typical of the art are those devices disclosed in the following patents:

| Country | Pat. No. | Inventor(s) | Issue Date |
| --- | --- | --- | --- |
| U.S. | 3,874,339 | Coulbourn | Apr. 1, 1975 |
| Sweden | 113,556 | Petersson | Mar. 20, 1945 |

The '339 patent discloses an anti-pull leash mechanism for attachment to a dog collar. Coulbourn's collar attachment includes at least one electrode for delivering an electric shock to a dog. The mechanism is spring activated such that as the dog strains against the leash, a spring switch closes an electrical circuit, thus delivering an electric pulse to the electrodes. Likewise, the '556 patent shows a dog collar with electrical probes on the interior thereof. These probes are manually operated by switch contacts in the leash handle. The power pack and shock circuitry are carried by the person walking the dog. While these types of devices address the problem associated with differing magnitudes of corrective stimuli, few owners desire repetitive shock treatment for a loved pet.

Accordingly, it is an object of the present invention to provide a leash collar having a behavior reinforcement module that is activated by a control module mounted proximate the handle of the leash.

A further object of the present invention is to utilize a behavior reinforcement module that emits a corrective stimulus consisting of an electrical stimulus coupled with an audible warning sound such that, through repetition, the animal will associate with the audible warning sound with the electrical stimulus permitting the audible warning sound to deter prohibited actions by the animal.

Still a further object of the present invention is to provide such a leash having a negative reinforcement delivery system utilizing a programmable intensity level such that a trainer can tailor the magnitude of the electrical stimulus to the size and pain threshold of the dog.

Yet another object of the present invention is to provide a training leash that is readily adaptable to other proven correction techniques, such as ultrasonic sound or spray.

Other objects and advantages over the prior art will become apparent to those skilled in the art upon reading the detailed description together with the drawings as described as follows.

DISCLOSURE OF THE INVENTION

In accordance with the various features of this invention, an electronic training leash and collar is provided for training an animal by providing consistent negative reinforcement regardless of the preferences and abilities of the trainer. The electronic training leash comprises an elongated leash member having a reinforcement module for providing a corrective stimulus to the animal when the trainer presses a button located on a control module attached to the leash.

The leash member includes an adjustable handle loop at one end to which the control module is attached and an adjustable collar loop at an opposite end to which the reinforcement module is attached. The control module and reinforcement module are electrically connected by a cable running along the leash. A sliding collar lock allows adjustment of the collar loop to fit a variety of dogs, regardless of size, and to properly position the reinforcement module opposite the direction of the restraining force.

The control module includes a programming switch for selecting the intensity of the correction stimulus, a correction switch for sending a correction stimulus to the animal, a warning switch for sending a warning stimulus to the animal, and a conventional visual indicator for providing a visual representation of operation of the reinforcement module during the correction cycle and of the selected corrective stimulus intensity level during the programming cycle.

The reinforcement module comprises a power source system and a negative reinforcement delivery system. The power source system includes at least one replaceable power source for supplying power to the reinforcement module, at least one capacitor for storing sufficient electrical charge to generate an effective corrective stimulus, and a voltage regulating system for providing a constant voltage to the reinforcement module.

The negative reinforcement delivery system comprises a reinforcement processing device for responding to trainer input from the control module, conventional pulse transformer for generating a electrical stimulus of desired intensity, at least one pair of output terminals for transferring the corrective stimulus from the reinforcement module to the animal, and an audio output device for providing an audible signal independent of other negative reinforcement. The corrective stimulus is a non-lethal, high-voltage, electrical stimulus coupled with an audible warning sound.

Responding to trainer input from programming switch, the reinforcement processing device enters the programming cycle. Each activation of the programming switch cycles the reinforcement processing device through a plurality of intensity levels incrementally spaced between a predetermined minimum and maximum voltage of which the negative reinforcement delivery device is capable of generating. Verification of the currently selected intensity level of the corrective stimulus is provided to the trainer through the visual indicator in the control module.

While the correction switch is depressed, the reinforcement processing device illuminates the visual indicator of the control module, generates an audible warning sound, and generates the corrective stimulus of the desired intensity level at the output terminals. After a specified, continuous time using the correction switch, the corrective stimulus is terminated and the correction switch is temporarily disabled. When pressed, the warning button of control module causes the reinforcement processing device to illuminate the visual indicator of the control module and to generate an audible warning sound. Training is accomplished by applying repeated correction stimuli teaching the animal to associate the audible warning sound with the electrical stimulus. After repetition, the animal will associate a negative response with a particular undesirable behavior and will be deterred from displaying such behavior.

BEST MODE FOR CARRYING OUT THE INVENTION

Figure 1:
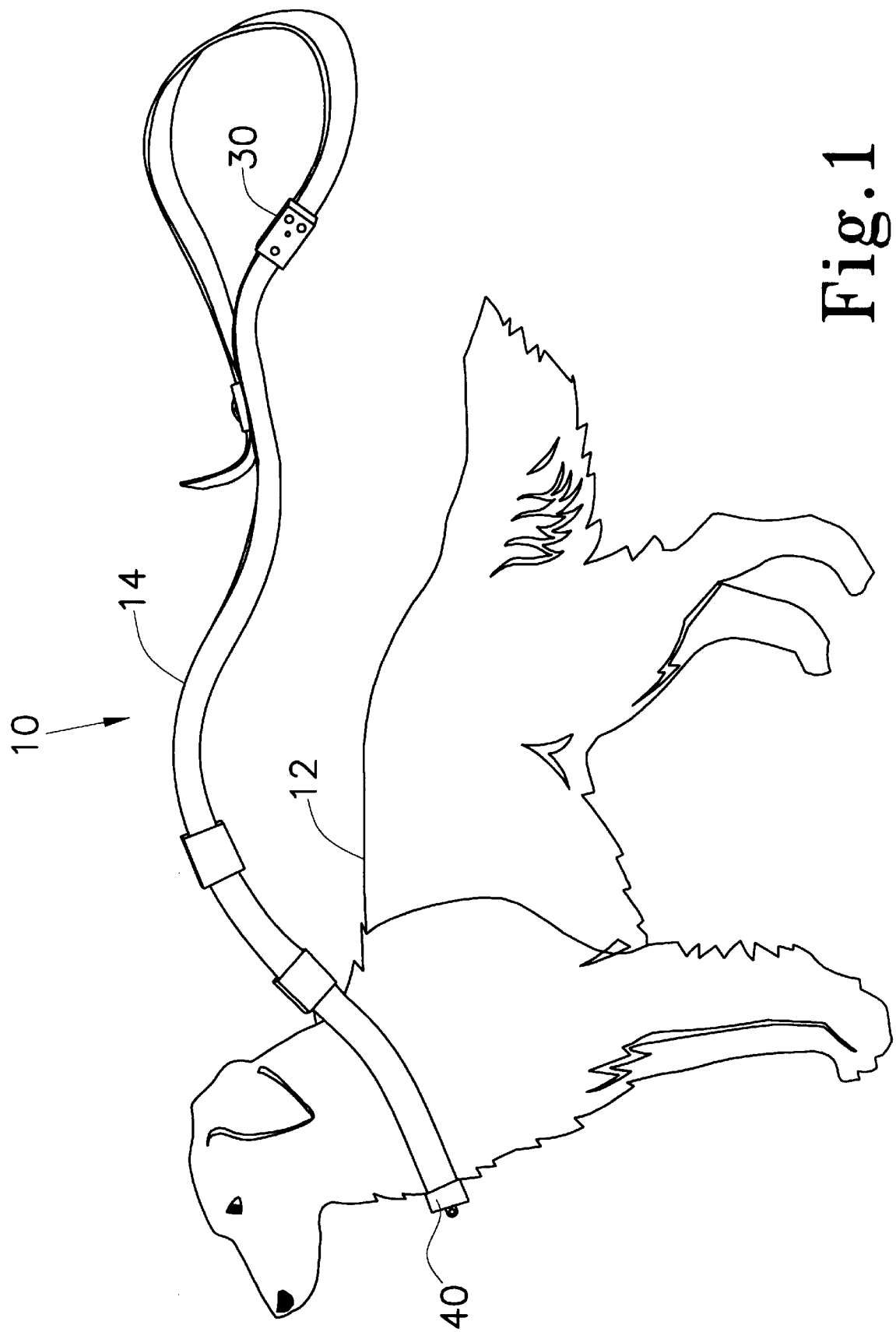
FIG. 1 illustrates a perspective view of the training leash and collar of the present invention placed on an exemplary dog's neck.

An electronic training leash and collar constructed in accordance with the present invention, is illustrated generally at 10 in the figures. The electronic training leash and collar, or electronic leash 10 is designed for training an animal 12, such as dog, by providing consistent negative reinforcement regardless of the trainer. FIG. 1 illustrates the electronic leash 10 comprising an elongated leash member 14 having a reinforcement module 40 for providing a corrective stimulus to the animal 12 upon request from a control module 30 manipulated by the trainer.

Figure 2:
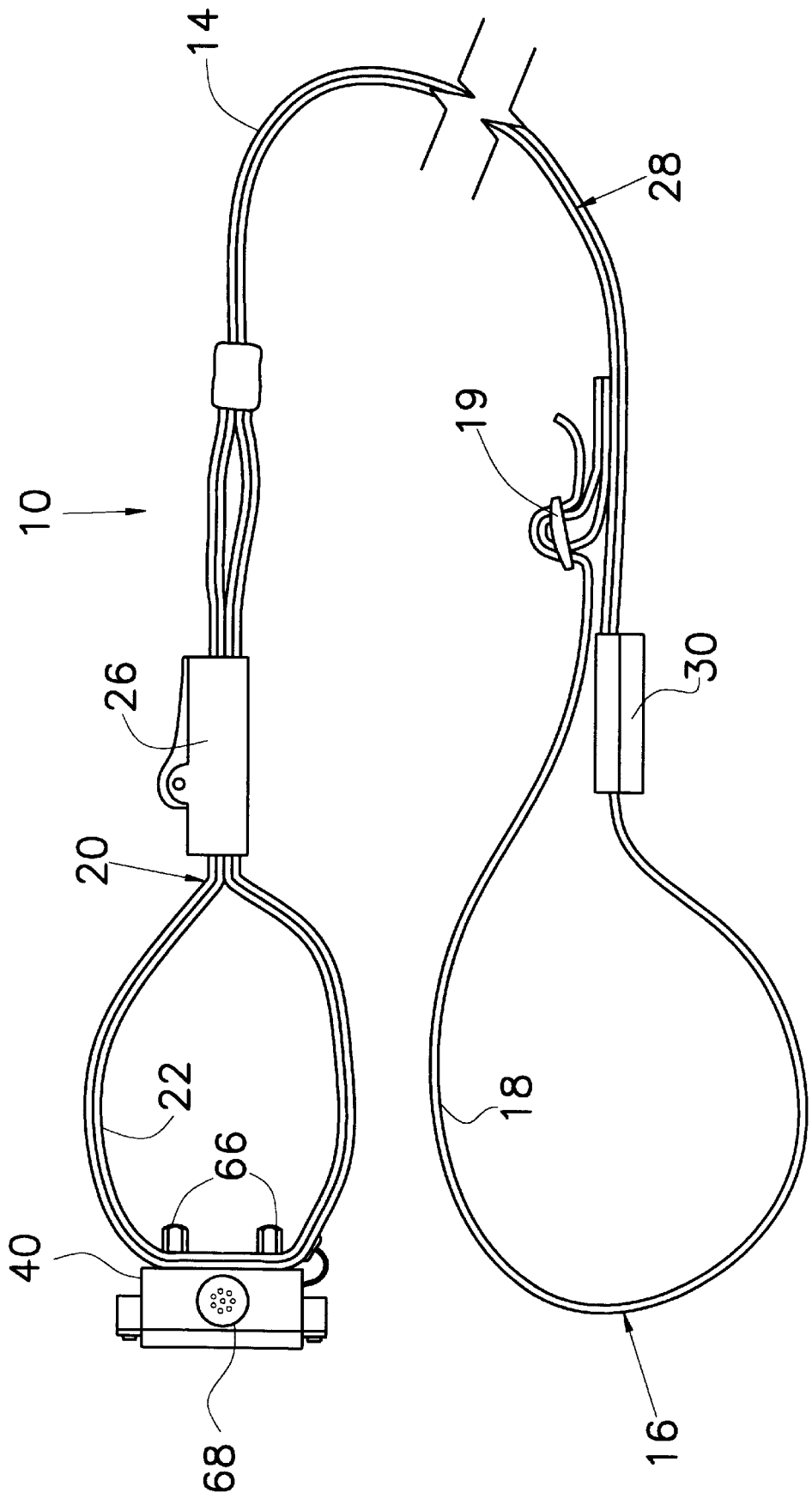
FIG. 2 illustrates a top plan view of the training leash illustrated in FIG. 1.

FIG. 2 illustrates the construction of the electronic leash 10. The elongated leash member 14 defines a first end 16 forming a handle loop 18 for use as a handle. A control module 30 attached proximate to the handle loop 18 provides a device for initiating negative reinforcement in response to the display of an undesirable behavior of the animal. In the illustrated embodiment, a buckle 19 is provided for adjusting the size of handle loop 18. Further, the elongated leash member 14 defines a second end 20 forming an adjustable collar loop 22 for use as a collar. A reinforcement module 40 attached proximate to the collar loop 22 provides the requested corrective stimulus to the animal 12. In the illustrated embodiment, the preferred placement of the reinforcement module 40 is 180° from the direction of the restraining force 24, illustrated in FIG. 1, exerted on the leash. Further, the illustrated embodiment includes a sliding collar lock 26 allowing for adjustment of the collar loop 22 to fit a variety of dogs, regardless of size, and to properly position the reinforcement module 40. Finally, a cable 28 electrically connects the control module 30 to the reinforcement module 40. In the illustrated embodiment, the cable 28 is a conventional ribbon cable. One skilled in the art will recognize other devices could be used to establish communication between the control module 30 and the reinforcement module 40. For example, communication could be accomplished using conventional radio frequency transmitting and receiving devices.

Figure 3A:
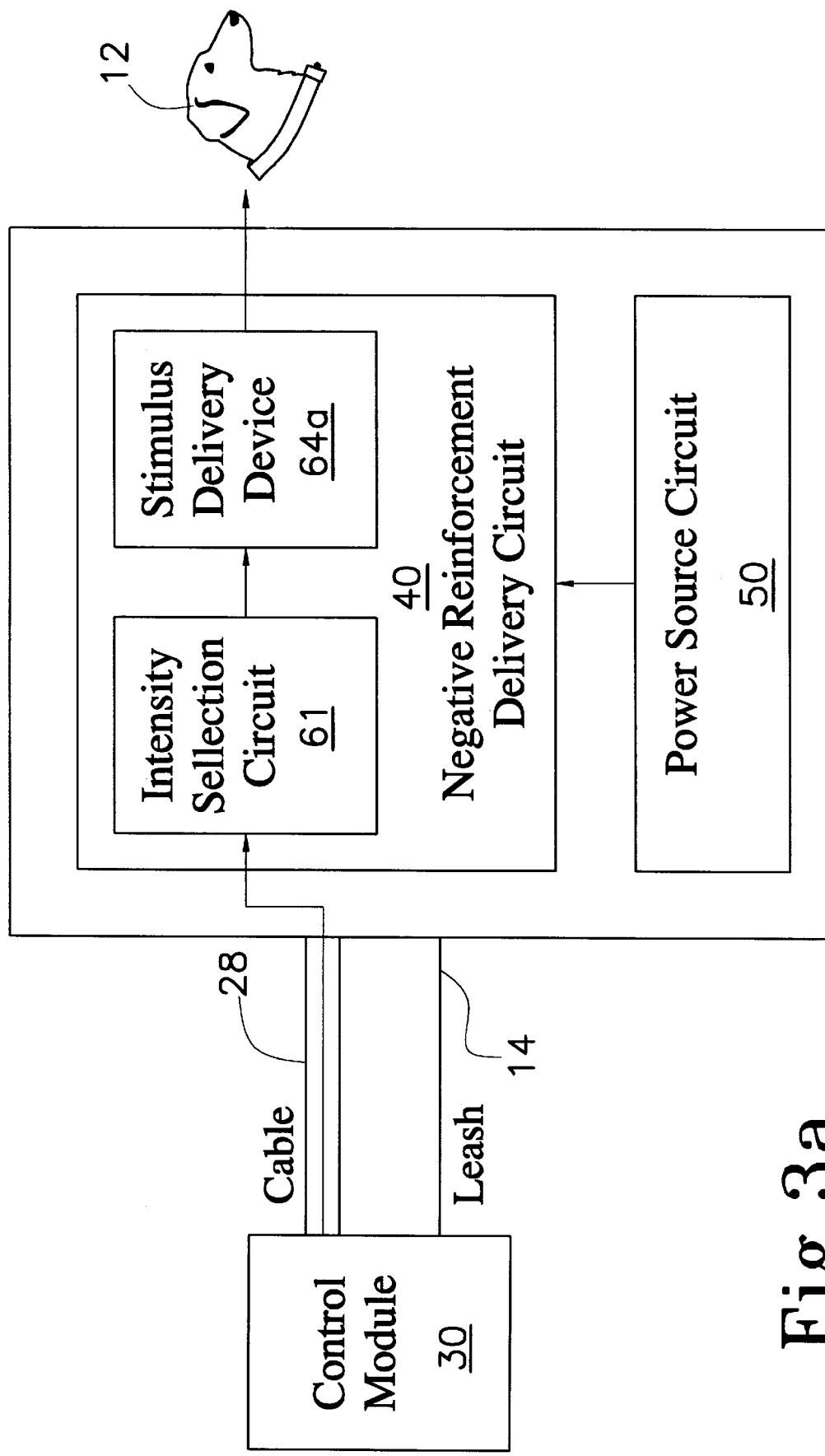
FIG. 3a, 3b, and 3c illustrates a block diagram of the training leash.
Figure 3B:
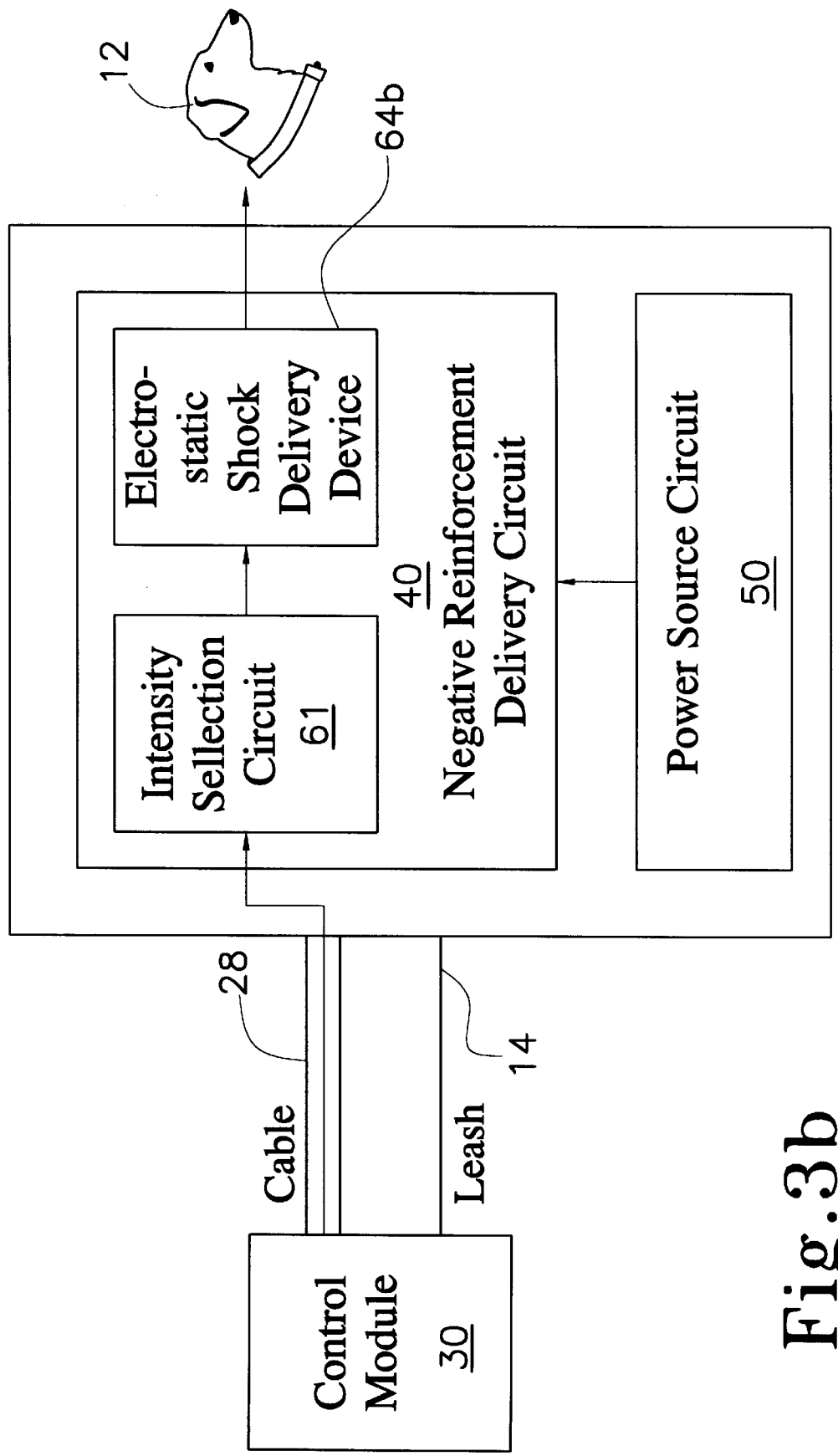
Figure 3C:
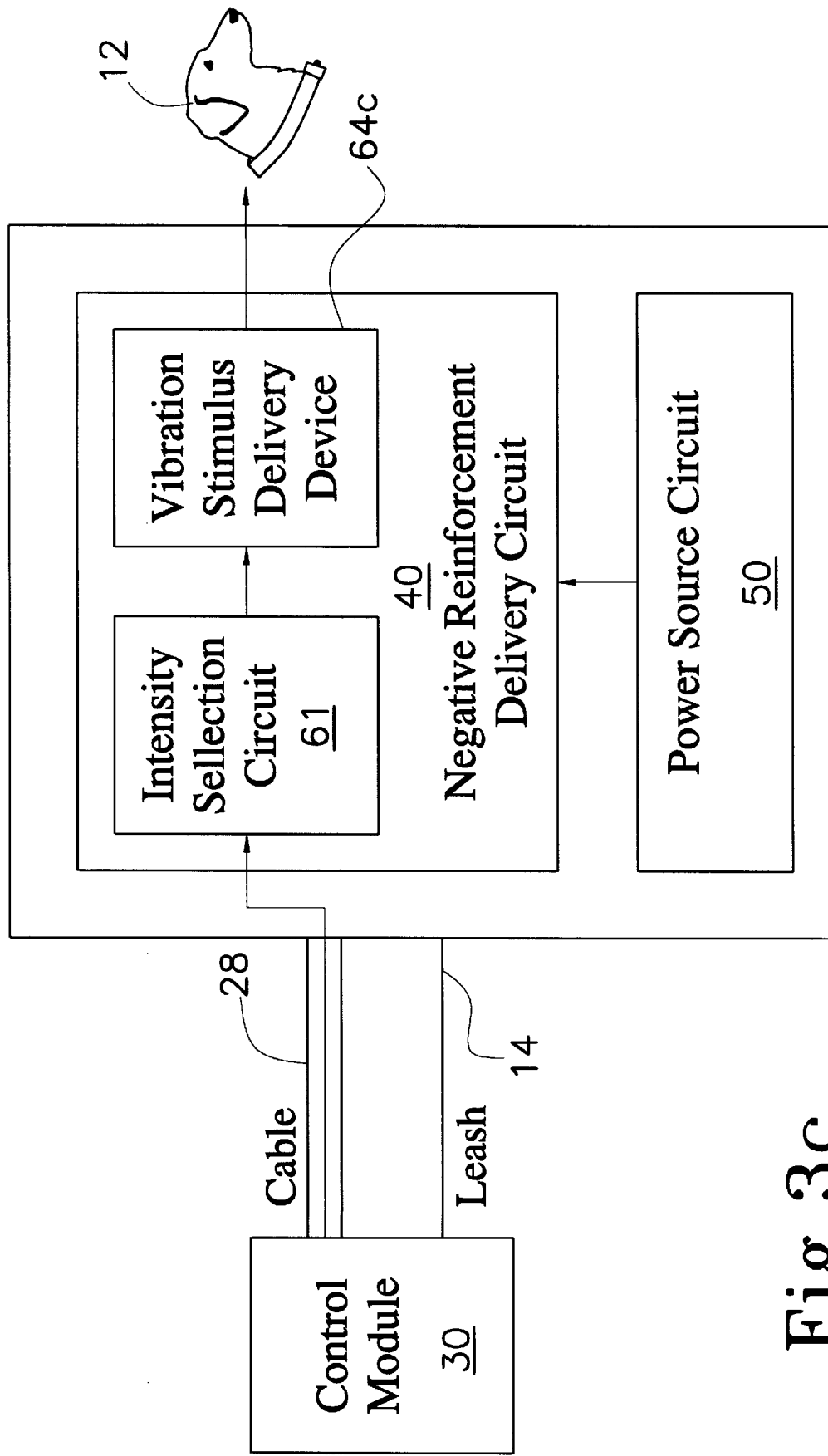

FIG. 3 comprises a block diagram illustrating the basic components and operation of the electronic leash 10. The control module 30 allows a trainer to select and administer reinforcement to the animal 12. Further, the control module 30 allows the trainer to select and receive an indication of the intensity of the reinforcement to be applied to the animal 12. The control module 30 is connected to the reinforcement module 40 by a cable 28 carried by the leash 14. The reinforcement module 40 includes a power source circuit 50 and a negative reinforcement delivery circuit 60. When the negative reinforcement delivery circuit 60 receives a programming signal, the intensity of the reinforcement is adjusted by the intensity level selection circuit 61. Similarly, when the negative reinforcement delivery circuit 60 receives a correction signal, a corrective stimulus is produced by the stimulus delivery device 64 at the intensity level indicated by the intensity level selection circuit 61. One skilled in the art will recognize that various types of stimulus delivery devices 64 could be used. For example, a pulse transformer can be used to deliver an electrostatic shock, an unbalanced motor or relay can be used to deliver a vibration, various output devices can deliver an audible or ultrasonic pulse, and various emitters can deliver a substance or odor, such as citronella, which is irritating to the animal 12.

Figure 4B:
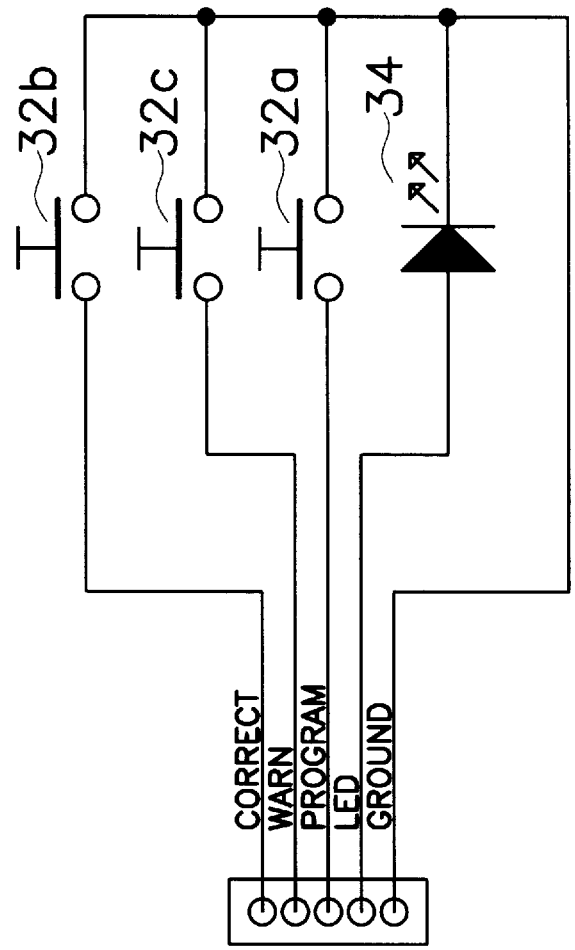
FIG. 4b illustrates a schematic diagram of the control module of the present invention.
Figure 4A:
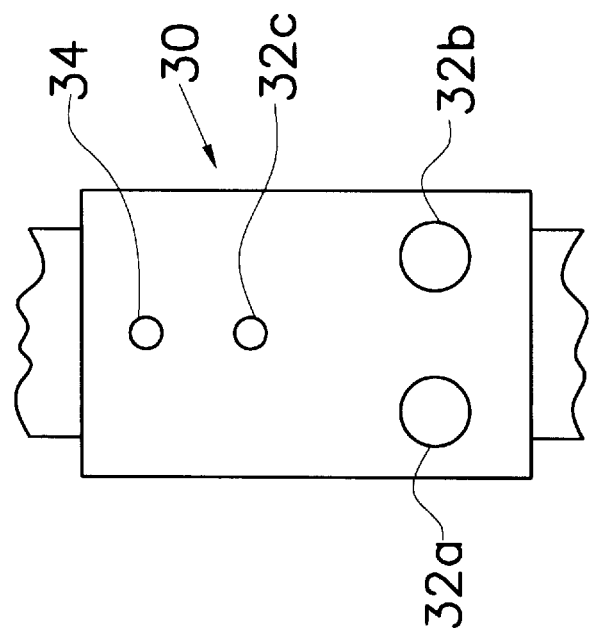
FIG. 4a illustrates a top plan view of the control module of the present invention.

The control module 30 and its associated schematic are illustrated in FIG. 4. The control module includes a plurality of conventional switch devices 32 and a conventional visual indicator 34. In the illustrated embodiment, the control module is provided with three switch devices 32: a programming switch 32a for selecting the intensity of the correction stimulus, a correction switch 32b for sending a correction stimulus to the animal 12, and a warning switch 32c for sending a warning stimulus to the animal 12. The visual indicator 34 provides a visual representation of operation of the reinforcement module 40 during the correction cycle and of the selected corrective stimulus intensity level during the programming cycle. In the illustrated embodiment, the visual indicator 34 is a light emitting diode (LED) which produces a steady illumination indication operation of the reinforcement module 40. During the programming cycle, the LED flashes a sequence representing the selected stimulus level. One skilled in the art will recognize that an audible indicator or other types of visual indicators could be used to indicate operation of the reinforcement module 40 or the selected corrective stimulus level.

Figure 5:
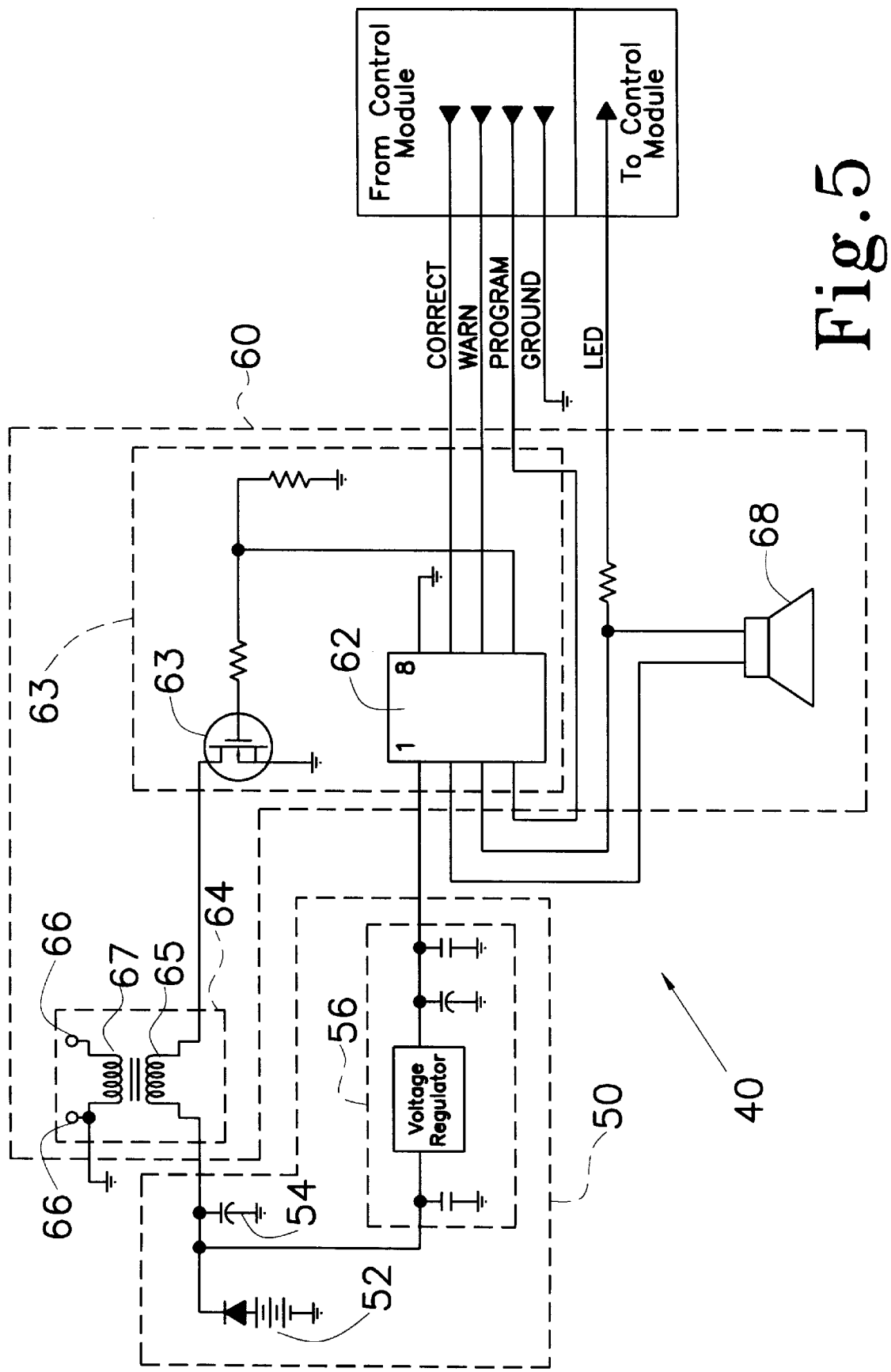
FIG. 5 illustrates a schematic diagram of the reinforcement module of the present invention.

FIG. 5 illustrates a schematic representation of the reinforcement module 40 configured to deliver an electrostatic shock. The power source circuit 50 includes at least one replaceable power source 52 for supplying power to the reinforcement module 40, at least one capacitor 54 for storing sufficient electrical charge to generate an effective corrective stimulus, and a voltage regulating system 56 for providing a constant voltage to the reinforcement module 40. Additionally, one skilled in the art will recognize that a conventional switch could be used to disconnect the power source 52 when the electronic leash 10 is not in use. A removable panel (not shown) provides access to the power source 52 for periodic replacement.

The intensity level selection circuit 61 includes a reinforcement processing device 62 for responding to trainer input from the control module 30. In the illustrated embodiment, the stimulus delivery device 64 conventional pulse transformer for generating a corrective stimulus of desired intensity and at least one pair of output terminals 66 for transferring the corrective stimulus from the reinforcement module 40 to the animal 12. Further, the reinforcement module 40 includes an audio output device 68 for providing an audible signal independent of other negative reinforcement. In the illustrated embodiment, the audio output device 68 is a piezoelectric buzzer. One skilled in the art will recognize that other audio output devices 68 could be used. Further, in the illustrated embodiment, the corrective stimulus is a non-lethal, high-voltage, electrical stimulus coupled with an audible warning sound. One skilled in the art will recognize that other types and combinations of corrective stimuli could be used, such as a vibration, or a substance or odor which is irritating to the animal 12. Referring back to FIG. 2, pertinent features of the reinforcement module 40, such as the audio output device 68 and the output terminals 66, are visible.

Responding to trainer input from programming switch 32a in the control module 30, the reinforcement processing device 62 enters the programming cycle. Each activation of the programming switch 32a cycles the reinforcement processing device 62 through a plurality of intensity levels incrementally spaced between a predetermined minimum and maximum voltage of which the negative reinforcement delivery circuit 60 is capable of generating. Verification of the currently selected intensity level of the corrective stimulus is provided to the trainer through the visual indicator 34 in the control module 30. By utilizing the programming button 32a, the trainer selects the intensity level of the corrective stimulus which elicits the appropriate response from the animal 12 to minimize concern over excessive negative reinforcement.

Upon activation of the correction button 32b the control module 30 by the trainer, the reinforcement processing device 62 illuminates the visual indicator 34 of the control module 30, activates the audio output device 68 to generate an audible warning sound, and biases a gating device 63 such that stored energy from the capacitor 54 is dissipated across the primary windings 65 of the pulse transformer to generate an electrical stimulus. The secondary windings 67 increase the voltage and reduce the current of the corrective stimulus for providing an effective corrective stimulus of the desired intensity level at the output terminals 66. In the illustrated embodiment, the gating device 63 is a conventional insulated-gate field-effect transistor. The output voltage of the reinforcement processing device 62, consists of a series of positive voltage pulses at a specified pulse width. By varying the number and width of the output pulses from the reinforcement processing device 62, the energy collected at the primary windings 65 is adjusted to generate a corrective stimulus of the desired intensity. The correction stimulus continues during the period while the correction switch 32b is closed. A timer in the reinforcement processing device 62 monitors the corrective stimulus for excessive time length and temporarily disables the correction switch 32b to avoid abuse of the correction stimulus. For example, the reinforcement processing device 62 may terminate the corrective stimulus after three continuous seconds of operation and disables the correction switch 32b for thirty seconds. Of course, other preferred durations may be substituted as well.

Finally, in response to trainer input from the warning button 32c of control module 30, the reinforcement processing device 62 illuminates the visual indicator 34 of the control module 30 and activates the audio output device 68 to generate an audible warning sound.

Training an animal 12 using the electronic leash 10 begins with application of a correction stimulus to the animal 12 when the animal 12 undertakes a prohibited action. After repeated correction stimuli, the animal 12 associates the audible warning sound with the electrical stimulus and the animal 12 will associate a negative response with a particular undesirable behavior and will be deterred from displaying such behavior.

From the foregoing description, it will be recognized by those skilled in the art that an electronic training leash and collar offering advantages over the prior art has been provided. Specifically, the electronic training leash and collar provides a integrated device for training an animal with a consistent reinforcement regardless of the trainer. Further, the electronic leash provides for a corrective stimulus of variable intensity to customize training to a specific animal. Still further, the electronic leash provides a training device easily customizable to other correction stimuli.

While a preferred embodiment has been shown and described, it will be understood that it is not intended to limit the disclosure, but rather it is intended to cover all modifications and alternate methods falling within the spirit and the scope of the invention as defined in the appended claims.

I claim:

1. An improved electronic training leash and collar which includes a negative reinforcement delivery system for training an animal, said improved electronic training leash and collar comprising:

an elongated leash member defining a first end and a second end, said first end including a handle being configured for gripping by a trainer and said second end including a collar being configured to be worn by the animal;

a control module attached proximate to said first end, said control module having an indicator device for indicating the status of the improved electronic training leash and at least one switch for controlling operation of said improved electronic training leash; said at least one switch selected from the group consisting of a correction button, a warning button, and a programming button; said indicator device including at least one of an audible indicator and a visual indicator; and a reinforcement module attached proximate to said second end and in communication with said control module; said reinforcement module including a reinforcement circuit for responding to said at least one switch to deliver a selected stimulus to the animal; said at least one switch including a warning button and wherein said reinforcement circuit includes a warning stimulus delivery circuit responsive to said warning button for delivering said selected stimulus to the animal; said selected stimulus being a warning stimulus; said warning stimulus including at least one of an audible warning sound, a non-lethal, variable voltage, electrical stimulus, a variable voltage vibration, and a substance or odor which is irritating to the animal; said at least one switch including a correction button and wherein said reinforcement circuit includes a corrective stimulus delivery circuit responsive to said correction button for delivering said selected stimulus to the animal; said selected stimulus being a corrective stimulus; said corrective stimulus delivery circuit including at least one of an audio output device, a pair of electrically conductive terminals, a vibrator, and a dispenser; said corrective stimulus including at least one of an audible warning sound, a non-lethal, variable voltage, electrical stimulus, a variable voltage vibration, and a substance or odor which is irritating to the animal; said at least one switch including a programming button and wherein said reinforcement circuit includes an intensity selection circuit responsive to said programming button for selecting an intensity level for said selected stimulus; said intensity selection circuit provides for a plurality of incremental changes in said intensity level of said selected stimulus, said plurality of incremental changes in a range between a predetermined minimum and maximum intensity level; said reinforcement circuit including a timing circuit for monitoring excessive temporal application of said selected stimulus; said timing device terminating said selected stimulus and disabling said at least one switch after a specified correction usage time.

2. The improved electronic training leash and collar of claim 1 wherein said warning stimulus delivery circuit includes an audio output device for delivering said warning stimulus, said warning stimulus being a audible warning sound.

3. The improved electronic training leash and collar of claim 1 wherein said corrective stimulus delivery circuit includes said pair of electrically conductive terminals for applying said corrective stimulus to the animal, said corrective stimulus delivery circuit including a conventional pulse transformer for conditioning said corrective stimulus.

4. The improved electronic training leash and collar of claim 1 wherein said corrective stimulus delivery circuit includes said pair of electrically conductive terminals for applying said corrective stimulus to the animal and said audio output device; said corrective stimulus being a non-lethal, variable voltage, electrical stimulus coupled with an audible warning sound.

5. An improved electronic training leash and collar which includes a negative reinforcement delivery system for training an animal, said improved electronic training leash and collar comprising:

an elongated leash member defining a first end and a second end, said first end including a handle being configured for gripping by a trainer and said second end including a collar being configured to be worn by the animal;

a control module attached proximate to said first end, said control module having an indicator device for indicating the status of the improved electronic training leash and at least one switch for controlling operation of said improved electronic training leash; said at least one switch selected from the group consisting of a correction button, a warning button, and a programming button; said indicator device including at least one of an audible indicator and a visual indicator; and a reinforcement module attached proximate to said second end and in communication with said control module;

said reinforcement module including a reinforcement circuit for responding to said at least one switch to deliver a selected stimulus to the animal; said at least one switch including a warning button and wherein said reinforcement circuit includes a warning stimulus delivery circuit responsive to said warning button for delivering said selected stimulus to the animal; said selected stimulus being a warning stimulus; said warning stimulus including at least one of an audible warning sound and a non-lethal, variable voltage, electrical stimulus; said at least one switch including a correction button and wherein said reinforcement circuit includes a corrective stimulus delivery circuit responsive to said correction button for delivering said selected stimulus to the animal; said selected stimulus being a corrective stimulus; wherein said corrective stimulus delivery circuit includes said pair of electrically conductive terminals for applying said corrective stimulus to the animal, an audio output device, and a conventional pulse transformer for conditioning said corrective stimulus; said corrective stimulus being a non-lethal, variable voltage, electrical stimulus coupled with an audible warning sound; said at least one switch including a programming button and wherein said reinforcement circuit includes an intensity selection circuit responsive to said programming button for selecting an intensity level for said selected stimulus; said intensity selection circuit provides for a plurality of incremental changes in said intensity level of said selected stimulus; said plurality of incremental changes in a range between a predetermined minimum and maximum intensity level; said reinforcement circuit including a timing circuit for monitoring excessive temporal application of said selected stimulus; said timing circuit terminating said selected stimulus and disabling said at least one switch after a specified correction usage time.

6. A system for training a pet comprising:

an elongated leash member having a first end configured to be gripped by a trainer and a second end configured to be worn by a pet;

a control module attached to said elongated leash member proximate said first end;

a plurality of switches disposed upon said control module, said plurality of switches including at least a warning switch, a correction switch, and a programming switch;

a reinforcement module attached to said elongated leash member proximate said second end;

an audio output circuit disposed within said reinforcement module, said audio output device in eletrical communication with said warning switch;

a correction stimulus delivery circuit disposed within said reinforcement module, said correction stimulus delivery device in electrical communication with said correction switch;

an intensity level selection circuit disposed within said reinforcement module, said intensity level selection circuit in electrical communication with said programming switch and said correction stimulus delivery circuit; and a power supply in electrical communication with said control module and said reinforcement module.

7. The system of claim 6 wherein activating said programming switch signals said intensity level selection circuit to select one of a plurality of incremental changes in a range between a predetermined minimum and a predetermined maximum intensity level for a corrective stimulus delivered to the pet through said correction stimulus delivery circuit.

8. The system of claim 6 wherein said control module includes an indicator in electrical communication with said power supply for indicating an operational status of said system.

9. The system of claim 8 wherein said indicator is in electrical communication with said intensity level selection circuit such that when said programming switch is activated, said indicator indicates a currently selected intensity level.

10. The system of claim 6 further comprising a timing circuit in electrical communication with said correction stimulus delivery circuit, said timing circuit terminating application of a correction stimulus after a predetermined excessive correction application time.

11. The system of claim 10 wherein said excessive correction application time has been exceeded, said timing circuit further disabling said correction switch for a predetermined period of time.

* * * * *